No. 749,276. Patented January 12, 1904.

UNITED STATES PATENT OFFICE.

LUCIEN EILERTSEN, OF PARIS, FRANCE.

PROCESS OF RENDERING DENTURE-PLATES, &c., ANTISEPTIC.

SPECIFICATION forming part of Letters Patent No. 749,276, dated January 12, 1904.

Original applicaton fiiled February 25, 1901, Serial No. 48,681. Divided and this application filed October 9, 1901. Serial No. 78,147. (No specimens.)

*To all whom it may concern:*

Be it known that I, LUCIEN EILERTSEN, a citizen of the French Republic, and a resident of Paris, France, have invented certain new and useful Improvements in Processes of Rendering Denture-Plates, &c., Antiseptic, of which the following is a specification, this application being a division of my prior application, Serial No. 48,681, of February 25, 1901.

This invention relates to the rendering of india-rubber and celluloid objects for use in dentistry antiseptic without altering their composition.

Experience has shown that it is impossible to obtain absolute immunity from disease germs in artificial teeth and their accessory parts by the use of hard india-rubber, owing to the temperature necessary to harden this substance being so high that any antiseptic substances introduced would be volatilized.

The object of the present invention is to render denture-plates, &c., antiseptic in the manner presently set forth. I also obtain the advantages of strength and durability in the article produced.

The improved system, hereinafter described, is designed to remedy the defects of the existing system, defects which I may sum up as follows: In the use of celluloid there is a loss of antiseptic power, owing to the gradual dissolution of the medicaments, and the celluloid becomes disintegrated. From the mechanical point of view there is a want of rigidity, the celluloid constructions not being firmly enough held in the mouth. There is, moreover, not sufficient weight in such constructions. As regards india-rubber, it harbors parasites. As regards the springs used for joining denture-plates together, as set forth in my copending application, Serial No. 48,681, filed February 25, 1901, their spiral formation allows the accumulation within them of particles of food. India-rubber also soon loses its shape.

By my process I render the surface only of the india-rubber or the celluloid antiseptic by means of superficial layers secured thereto. In these superficial layers are incorporated the antiseptic substances, one of the preferable antiseptic substances which I use being salol in the quantity of thirty per cent. The said layers are not applied until the celluloid or the india-rubber have been submitted to the action of heat to be molded, so that the properties of the said substances cannot afterward be altered, and the medicaments incorporated in the superficial layers will preserve all their efficacy. The method of securing these superficial layers thus rendered antiseptic is as follows: Non-vulcanized india-rubber or celluloid is dissolved in suitable solvents—for example, cellulose in acetone, alcohol, or ether, and india-rubber in bisulfid of carbon, benzin, or chloroform. When the solution is effected, antiseptic or other medicaments are added to the solution to the extent desired, the whole being well mixed. Then one or several coatings of these solutions are applied to the surface of the rubber or celluloid. The latter is superficially dissolved under the influence of the solvents of the solutions, and a union is established between the substances in a state of solution and the celluloid or india-rubber. In this connection a distinction must be made between the celluloid and the india-rubber. The superficial layers fixed in the above-described manner may be secured to the celluloid after the latter has been submitted to heat; but it is not the same thing with india-rubber, because the latter has been vulcanized and has become completely insoluble by any of the usual solvents. It would be impossible, therefore, to effect the union in this case.

In order to completely secure the outer surfaces after the india-rubber has been heated, the following method is adopted: Before vulcanizing the india-rubber and while it is still soluble pure india-rubber without any trace of sulfur is secured to the former rubber, either in the form of an extremely thin sheet of india-rubber fastened by simple pressure or in the form of a solution, so that after having heated the india-rubber thus prepared a combination is obtained having the required strength and elasticity with a surface to which by any suitable means may be secured the superficial antiseptic coatings, the rubber at the surface having preserved the needful properties for this purpose. As there is no longer any need for heating, the action of the antiseptic medicaments incorporated in the superficial coating remains unaltered.

If it is wished to prevent the surface of the india-rubber from being adhesive once the surface is made antiseptic and if it is desired to give to the superficial coating all the qualities of vulcanized india-rubber without altering the medicaments by heat, this surface must be covered with a solution capable of vulcanizing the india-rubber while cold—for example, with a solution of chlorid of sulfur in bisulfit of carbon in which are incorporated medicaments also in solution, so as not only not to lessen the action of the antiseptics on the surface, but rather to increase that action. Also in cases where there is no very great friction and where simple adherence appears to be sufficient the india-rubber may be heated beforehand and only covered afterward with a varnish, the basis of which is india-rubber or other suitable substance in which antiseptic substances are incorporated.

It is evident that by means of the superficial layers of antiseptic solutions the superficial coatings of celluloid and india-rubber may be renewed as often as required and when the action of the medicaments becomes insufficient.

When it is required to replace the rubber in certain cases, hereinafter referred to, any suitable tissue may be made antiseptic by means of a solution of india-rubber or other varnish in which antiseptic substances are incorporated.

Having fully described my invention, what I claim, and desire to secure by Letters Patent, is—

1. The herein-described process of rendering a hard-rubber plate waterproof and antiseptic, which consists in applying to the surface of the plate before heating the latter a solution of pure india-rubber containing no sulfur but containing an antiseptic substance.

2. The herein-described process of rendering denture-plates, &c., antiseptic which consists in first preparing a solution of non-vulcanized india-rubber, adding an antiseptic to the solution and applying a coating of the solution to the surface of the article to be treated.

3. The herein-described process of rendering denture-plates, &c., antiseptic, which consists in applying a thin sheet of pure india-rubber containing no sulfur to the surface of the plate, or other article, heating the latter to effect the union of the coating and the plate and then applying to said coating a coating of a solution of non-vulcanized india-rubber containing an antiseptic.

In testimony whereof I have hereunto set my hand in presence of two witnesses.

LUCIEN EILERTSEN.

Witnesses:
ADOLPH STURM,
J. ALLISON BOWEN.